US012764555B2

(12) United States Patent
Alcanices et al.

(10) Patent No.: US 12,764,555 B2
(45) Date of Patent: Oct. 13, 2026

(54) SYSTEM AND METHOD FOR AUTHORIZING MODIFICATIONS TO TELECOMMUNICATIONS NETWORK ACCESS NODES USING STANDARD QUANTITATIVE METRICS

(71) Applicant: T-Mobile USA, Inc., Bellevue, WA (US)

(72) Inventors: Eaian Lorrie Alcanices, Dublin, CA (US); Terry Carpenter, Spokane, WA (US); Guangrui Su, Union City, CA (US); Yong Bin Wu, Dublin, CA (US)

(73) Assignee: T-Mobile USA, Inc., Bellevue, WA (US)

( * ) Notice: Subject to any disclaimer, the term of this patent is extended or adjusted under 35 U.S.C. 154(b) by 323 days.

(21) Appl. No.: 18/660,148

(22) Filed: May 9, 2024

(65) Prior Publication Data

US 2025/0350959 A1 Nov. 13, 2025

(51) Int. Cl.

*H04W 16/18* (2009.01)
*H04W 16/22* (2009.01)
*H04W 24/02* (2009.01)

(52) U.S. Cl.

CPC ........... *H04W 16/18* (2013.01); *H04W 16/22* (2013.01); *H04W 24/02* (2013.01)

(58) Field of Classification Search

CPC ...... H04W 16/18; H04W 16/22; H04W 24/02

See application file for complete search history.

(56) References Cited

U.S. PATENT DOCUMENTS

| | | | |
|---|---|---|---|
| 7,385,947 | B2 | 6/2008 | Wu et al. |
| 7,844,663 | B2 | 11/2010 | Boutboul |
| 7,916,635 | B2 | 3/2011 | Casey et al. |
| 9,094,456 | B2 | 7/2015 | Kopplin |
| 9,363,660 | B2 | 6/2016 | Evans et al. |
| 9,432,415 | B2 | 8/2016 | Evans |
| 9,438,579 | B2 | 9/2016 | Evans et al. |
| 9,787,753 | B2 | 10/2017 | Baldachin et al. |

(Continued)

FOREIGN PATENT DOCUMENTS

| | | | |
|---|---|---|---|
| CN | 112106326 | B | 11/2022 |
| KR | 20000052820 | A | 8/2000 |

(Continued)

*Primary Examiner* — Barry W Taylor

(74) *Attorney, Agent, or Firm* — Ashurst Perkins Coie US LLP

(57) ABSTRACT

This technology relates to a system for reviewing the feasibility of requests to modify telecommunications network access nodes. The system reviews accompanying data presented for the requested change by pre-processing data. The pre-processing includes calculating, based on the accompanying data of the request, population data, coverage data, and subscriber data. Based on the population data, the coverage data, and the subscriber data, the system may generate a justification package and transmit it to a decision center, a software program designed to assess the desirability of changes to telecommunications network access nodes. The decision center responds to the request with an approval or rejection decision. The system may receive further requests to modify the telecommunications network access node following the approval or rejection of the initial request.

20 Claims, 4 Drawing Sheets

(56) References Cited

U.S. PATENT DOCUMENTS

| | | | |
|---|---|---|---|
| 10,411,946 | B2 | 9/2019 | Tapia et al. |
| 10,425,832 | B1 | 9/2019 | Zawadzki et al. |
| 10,623,256 | B2 | 4/2020 | Zawadzki et al. |
| 10,797,989 | B2 | 10/2020 | Tillotson et al. |
| 10,868,673 | B2 | 12/2020 | Mahanta et al. |
| 11,071,042 | B2 | 7/2021 | Lonkar |
| 11,106,984 | B2 | 8/2021 | Dooley et al. |
| 11,109,194 | B1 | 8/2021 | Pinheiro et al. |
| 11,184,356 | B1 | 11/2021 | Tandon et al. |
| 11,202,255 | B1 | 12/2021 | Shaw |
| 11,223,566 | B2 | 1/2022 | Serrano Garcia et al. |
| 11,463,865 | B1 | 10/2022 | Buscher |
| 11,516,071 | B2 | 11/2022 | Karapantelakis et al. |
| 11,544,291 | B2 | 1/2023 | Iftemi |
| 11,671,831 | B2 | 6/2023 | Stenfelt et al. |
| 11,711,284 | B2 | 7/2023 | Svennebring et al. |
| 2004/0122687 | A1 | 6/2004 | Creamer et al. |
| 2004/0266438 | A1 | 12/2004 | Bjelland et al. |
| 2015/0215791 | A1* | 7/2015 | Geller .................... H04W 24/02 455/446 |
| 2016/0014613 | A1* | 1/2016 | Ponnampalam ...... H04W 16/18 370/254 |
| 2017/0215085 | A1* | 7/2017 | Udeshi ................ H04W 64/006 |
| 2018/0331828 | A1* | 11/2018 | Pakkan ..................... H04L 9/30 |
| 2023/0156447 | A1 | 5/2023 | Hooker |
| 2024/0015499 | A1 | 1/2024 | Nguyen et al. |
| 2024/0040395 | A1 | 2/2024 | Cionca et al. |
| 2024/0040396 | A1 | 2/2024 | Cionca et al. |
| 2025/0212009 | A1* | 6/2025 | Panchal ................ H04W 16/24 |
| 2025/0240652 | A1* | 7/2025 | Mada ...................... H04L 41/16 |

FOREIGN PATENT DOCUMENTS

| | | | |
|---|---|---|---|
| KR | 20110115521 | A | 10/2011 |
| WO | 9959375 | A2 | 11/1999 |
| WO | 2024025649 | A1 | 2/2024 |

* cited by examiner

SYSTEM AND METHOD FOR AUTHORIZING MODIFICATIONS TO TELECOMMUNICATIONS NETWORK ACCESS NODES USING STANDARD QUANTITATIVE METRICS

BACKGROUND

Project management focuses on planning and organizing a project and its resources. This includes identifying and managing the lifecycle to be used, the desired effect of the project, and the cost of the project, among other aspects. In the context of telecommunications, projects such as proposed modifications to a cell tower require an approval process. Currently, such approval decisions are made on an ad-hoc basis without much regard for objective considerations of empirical metrics that allow for easy parallel comparison.

BRIEF DESCRIPTION OF THE DRAWINGS

Detailed descriptions of implementations of the present invention will be described and explained through the use of the accompanying drawings.

Figure 1:
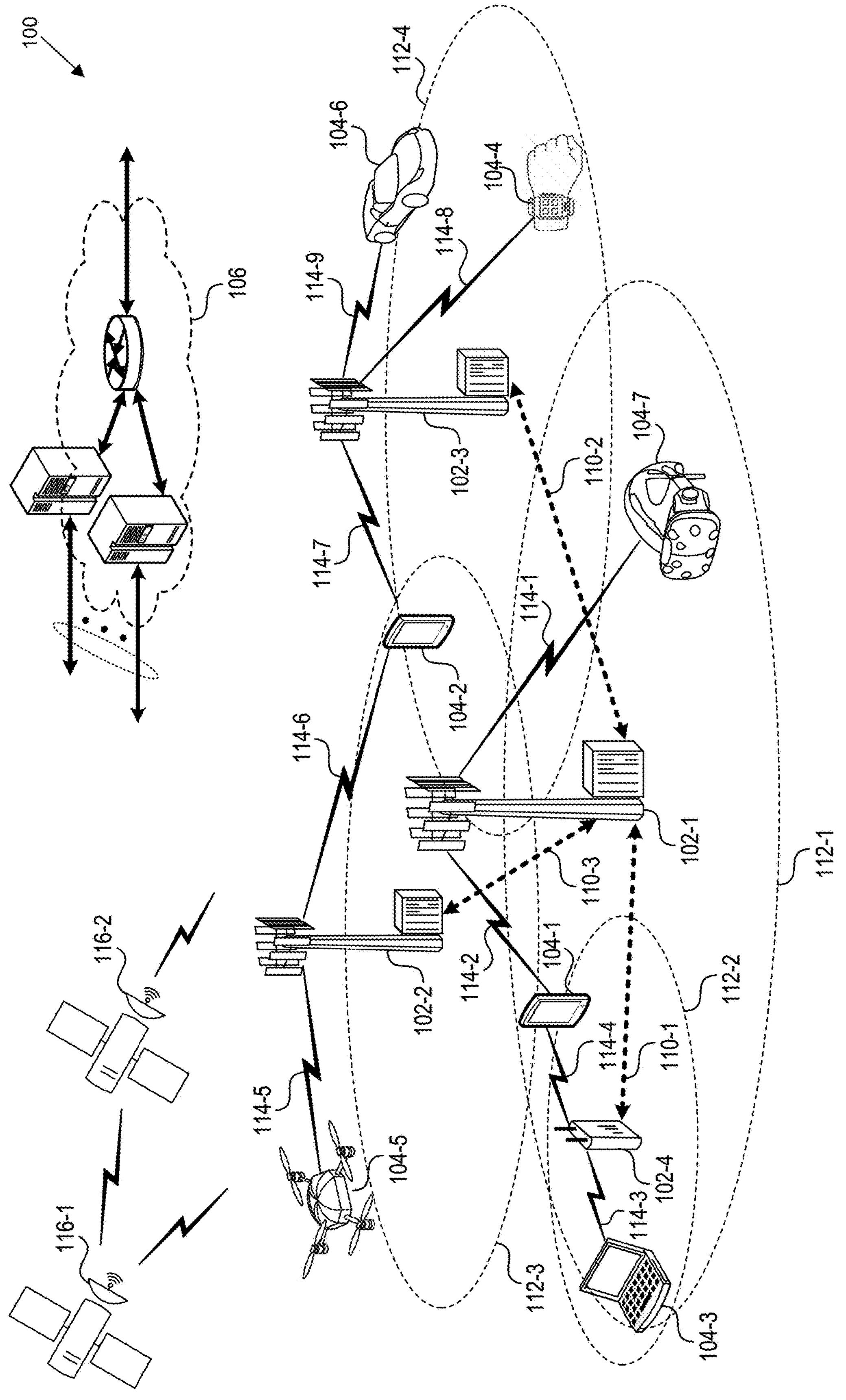
FIG. 1 is a block diagram that illustrates a wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The disclosed technology relates to a system executing a method for reviewing the feasibility of requests to modify telecommunications network access nodes such as cell towers. For example, a request may be to install a new cell tower in a geographic region. The system reviews accompanying data presented for the requested change by pre-processing data. The pre-processing may include formatting and data cleansing. In addition, the system may calculate, based on the accompanying data of the request, population data, coverage data, and subscriber data in relation to the proposed modification to the telecommunications network access node.

Population data indicates an estimated population of potential subscribers of the telecommunications network in the geographic region. For example, population data may be estimated using federal highway traffic data to project the number of potential subscribers living in the geographic region.

Coverage data indicates an estimated change in coverage caused by the requested modification to the network access node. For example, forecasts of increased strength signal, measured numerically as a Reference Signal Received Power, can be a part of coverage data for the proposed modification.

Subscriber data indicates an expected value of subscribers newly or potentially added to the telecommunications network. For example, subscriber data can include a forecast of customer lifetime value, calculated based on a projection for average plan length on the telecommunications network multiplied by the average plan price per month.

Based on the population data, the coverage data, and the subscriber data, the system may generate a justification package. The justification package is formatted to include standard metrics, allowing for easy and quantitative comparisons of requests to modify telecommunications access nodes. The system transmits the justification package to a decision center, which is a software program designed to assess the desirability of changes to telecommunications network access nodes.

The decision center responds to the request with an approval or rejection decision. In some implementations, the decision center may include reasons for approval or rejection in the decision. Additionally or alternatively, the decision center may indicate alternative modifications to the telecommunications network access node. For example, the decision center may decline a request to build a new cell tower in a location due to the coverage to cost ratio falling below a threshold. However, the decision center may suggest the possibility of building additionally antenna on existing cell towers to increase signal strength, due to promising coverage data of the proposed modification. The system may consequently receive additional requests to modify the telecommunications network access node, the additional requests proposing alternate modifications in light of approval or rejection decisions from the decision center.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunications network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the system 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provides data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or Time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites such as satellites 116-1 and 116-2 to deliver services anywhere and anytime and provide coverage in areas that are unreachable by any conventional Terrestrial Network (TN). A 6G implementation of the network 100 can support terahertz (THz) communications. This can support wireless applications that demand ultra-high quality of service requirements and multi-terabits per second data transmission in the 6G and beyond era, such as terabit-per-second backhaul systems, ultrahigh-definition content streaming among mobile devices, AR/VR, and wireless high-bandwidth secure communications. In another example of 6G, the network 100 can implement a converged Radio Access Network (RAN) and Core architecture to achieve Control and User Plane Separation (CUPS) and achieve extremely low User Plane latency. In yet another example of 6G, the network 100 can implement a converged Wi-Fi and Core architecture to increase and improve indoor coverage.

Figure 2:
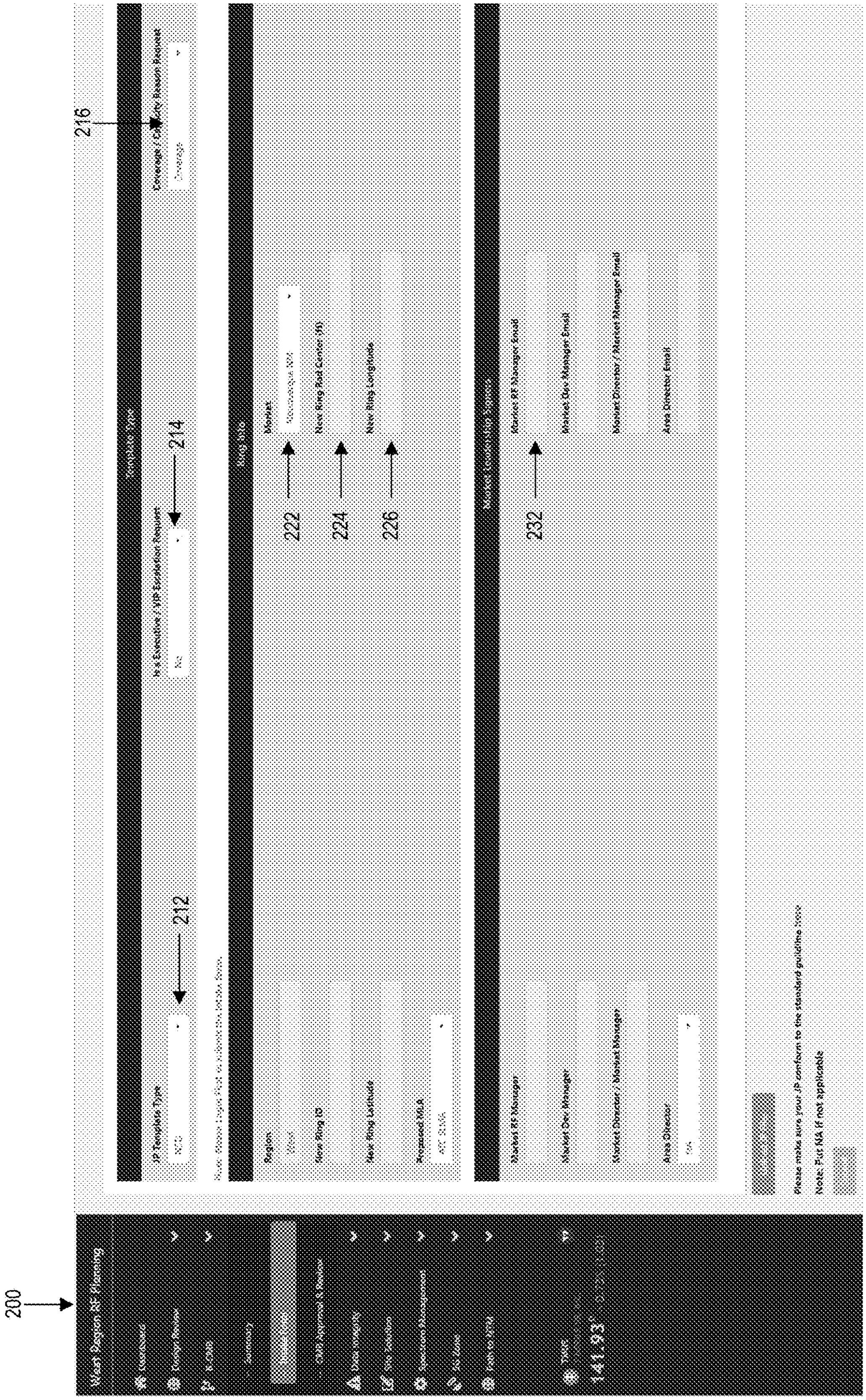
FIG. 2 is a demonstration of an interface for submitting modification requests in a review session for a telecommunications network access node.

FIG. 2 is an illustration of fields in the accompanying data sent for a request to modify a telecommunications network. For example, displayed is an interface for submitting accompanying data for a modification request in Review Session 200. The interface can display multiple pages pertaining to the approval status of one or more modification requests, information required by the decision center, and other metadata required in association with Review Session 200.

Among the accompanying data is a request classification. Requests to modify telecommunications network can be based on a template (e.g., Template 212), which corresponds to a required data format, and a set of required information specific to the template. For example, requests aimed at improving network coverage may be required to provide comprehensive coverage data in order for the decision center to effectively gauge the cost-effectiveness for improving the coverage of the network. In some embodiments, the request may be tagged with an importance level (e.g., Escalation Level 214), indicating the level of review required for the modification request. Modification requests specifying more extensive additions to the telecommunications network are more likely to require higher standards of, for example, a higher numerical threshold for a return metric. Additionally or alternatively, the importance level may cause the required modification to be reviewed by multiple parties, including the decision center, the input from all of which may affect the modifications implemented. In Review Session 200, the request for modification also includes a substantive classification of the request (Classification 216). Classification 216 indicates that the basis for adjusting the telecommunications network access node is to improve coverage. In a different example, a modification may be intended to improve capacity in an area with heavy network traffic to reduce network lag. In yet another example, a modification may be intended to attract new subscribers to the telecommunications network.

The accompanying data of a modification request, as displayed in Review Session 200, may also include technical specifications of the modification. For example, the accompanying data may indicate an intended market division (Market Division 222) that the telecommunications network access node affects. Additional specifications include a radial length from the cell tower that the telecommunications network access node can cover (Radius 224), a geographical location for the proposed modification (Location 226), and a geofence associated with the area affected by the modification to the telecommunications network access node. Such information can be used to compute coverage data by a preprocessing program in generating the justification package for reviewing the feasibility of the proposed modification.

In some embodiments, the accompanying data may include references to, for example, managers of projects related to or corresponding to the proposed modifications. The accompanying data may include contact information (e.g., Contact Information 232) for people who are expected to provide additional technical details, or communicate with the decision center with amended requests for modification in response to approval or rejection decisions from the decision center. The accompanying data submitted to Review Session 200 may be updated or supplemented with more up-to-date information, for example to satisfy formatting or data integrity requirements of the preprocessing program that generates the justification package.

Figure 3:
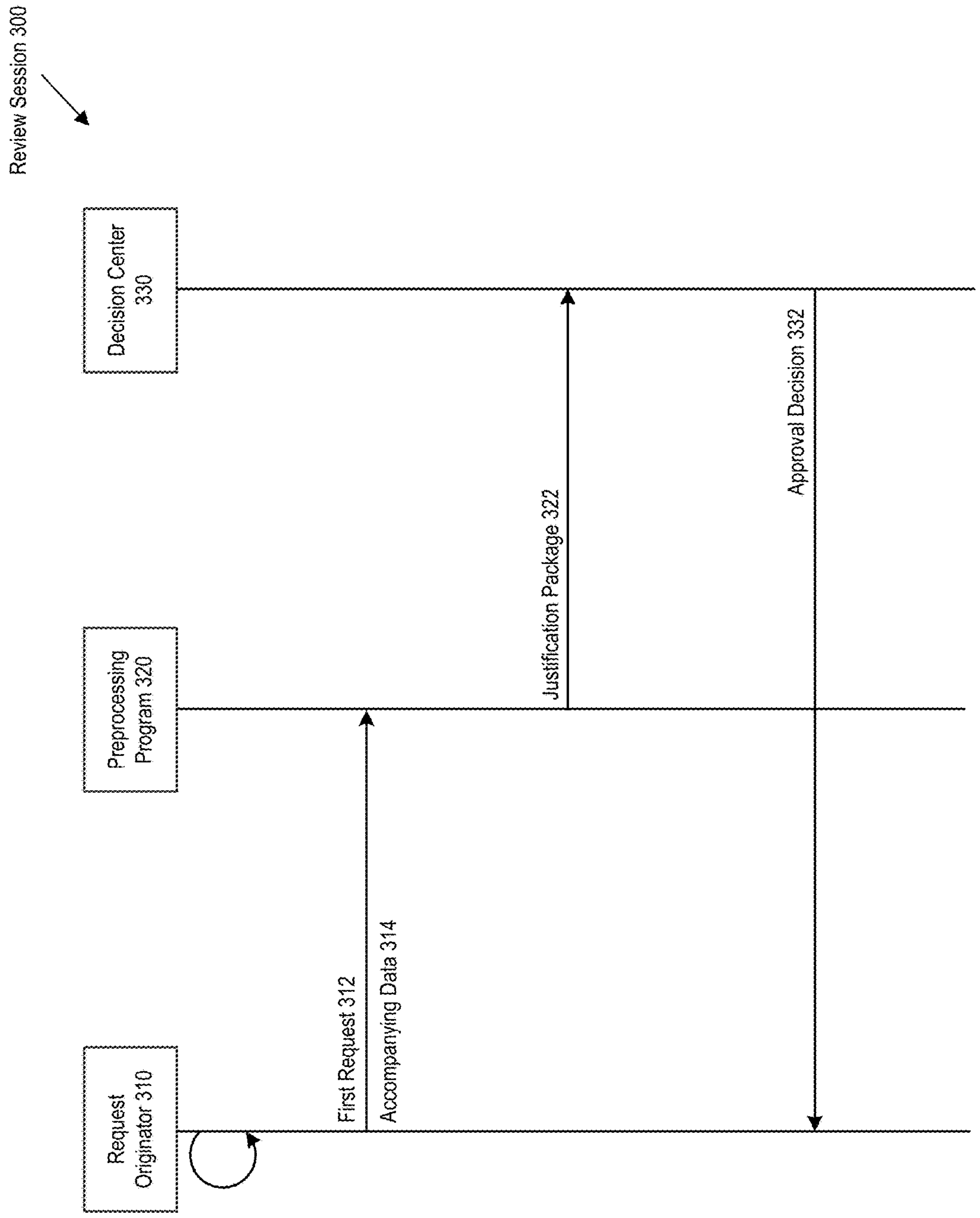
FIG. 3 is a workflow diagram illustrating the processes of a review session by which requests to modify access nodes of a telecommunications network are approved.

FIG. 3 shows a flow diagram illustrating the process of approving a request to modify a telecommunications network node, from request origination to approval and further adjustments as deemed necessary.

Request Originator 310 may generate a proposed change to a telecommunications network access node. For example, Request Originator 310 can suggest expanding the capacity of an existing cell site of a telecommunications network, such as adding a cell tower or a transceiver to a cell tower complex. Alternatively, the request to modify the telecommunications network node (First Request 312) can specify building a new telecommunications network access node at a location, building a new cell tower complex to provide additional coverage to an area where coverage was insufficient or absent. In a different example, First Request may specify reducing the capacity or decommissioning a telecommunications network access node.

First Request 312 corresponds to Accompanying Data 314. Accompanying Data 314 describes in numerical terms the desired change to the telecommunications network access node and contains data representing the expected change in coverage and subscriber count for the telecommunications network, for example. For example, Accompanying Data 314 describes a geographic region supposedly covered by the modified telecommunications network access node. The geographic region can be defined with a geofence described by longitudinal and latitudinal coordinates. The geographic region can correspond to varying levels of signal strength symbolizing the coverage that the modified telecommunications network access node provides.

Review Session 300, using Preprocessing Program 320, generates Justification Package 322 based on Accompanying Data 314. For example, Preprocessing Program 320 generates population data, coverage data, and subscriber data comprising Justification Package 322.

Preprocessing Program 320 generates population data by retrieving information regarding vehicle traffic data from federal highway usage databases. Based on the vehicle traffic data, the system applies a mathematical formula to determine an active population in the geographic region, which represents the number of people possibly interested in joining the telecommunications network.

Preprocessing Program 320 determines coverage data by estimating a change in the coverage area for the geographic region caused by the requested modification in First Request 312. For example, Preprocessing Program 320 determines an extent of existing coverage based on telecommunications network access nodes already in or around the geographic region. Based on the location and the nature of the modifications requested in First Request 312, Preprocessing Program 320 computes a degree of overlap. For example, adding a transceiver to an existing cell tower will result in more overlap than a different modification proposing a new cell tower in a location with little existing coverage. The system deducts the degree of overlap from estimated coverage data included in Accompanying Data 314 to generate coverage data for Justification Package 322.

Preprocessing Program 320 can compute subscriber data by forecasting a signup rate capturing an average amount of new subscribers expected to result from the modifications described in First Request 312. For example, Preprocessing Program 320 refers to historical data regarding signup rates following similar modifications to other telecommunications network access nodes. Additionally, Preprocessing Program 320 forecasts the average value of a new subscriber by multiplying an estimated duration of service by payment per period. Using the signup rate and the average subscriber value, the system determines subscriber data in the format of a justification package.

Concurrently with or after generating population data, subscriber data and coverage data, Preprocessing Program 320 performs a data cleansing process to regularize the format and value range for the data in Justification Package 322. For example Preprocessing Program 320 generates values for missing entries of data, removes duplicate data, convert date and time data to the standard format, and validates data accuracy. Justification Package 322 is tailored to suit the specific input style of Decision Center 330, which is a software program designed to process a particular type of data. For example, Preprocessing Program 320 standardizes units of measurement by multiplying population figures measured in the 100,000 unit to represent the number of people in plain numerical form. Preprocessing Program 320 performs basic computations based on Justification Package 322 such as multiplying a cost per modification by the number of modifications requested by First Request 312 to generate an overall cost estimate for First Request 312.

Review Session 300 then transmits Justification Package 322 to Decision Center 330. Decision Center 330 is a software program configured to assess the viability of First Request 312 based on Justification Package 322. For example, Decision Center 330 is an algorithm configured to intake data in a standard format used across all requests for modifications to telecommunications network access nodes. Decision Center 330 makes a decision regarding the approval or rejection of First Request 312 based on Justification Package 322. For example, Decision Center 330 considers a return metric generated based on a growth estimate. Decision Center 330 computes the growth estimate by multiplying an average subscriber value by an incremental population change as indicated by the population data. Dividing the growth estimate by a cost estimate found in Justification Package 322 that represents the likely cost of the modification to the network access node yields the return metric. In some embodiments, Decision Center 330 may base the approval decision on whether the return metric exceeds a numeric threshold. Decision Center 330 may additionally or alternatively consider other metrics. For example, Decision Center 330 bases the decision to approve First Request 312 on a coverage return metric in situations where additional coverage is desired more than return considerations. Decision Center 330 calculates a coverage return metric by dividing the coverage data in Justification Package 322 by a cost estimate to generate a numerical score used to evaluate the cost-effectiveness of First Request 312 in expanding the coverage of the telecommunications network. For example, Decision Center 330 can choose to approve a modification request if either the return metric or the coverage return metric exceeds a predetermined numerical threshold, and reject the modification request otherwise.

Decision Center 330 then transmits Approval Decision 332 to Request Originator 310. Approval Decision 332 may include a recommendation for an additional modification to the network access node, a request for information in addition to the accompanying data, or a reason for rejecting the requested modification. For example, Decision Center 330 suggests, based on First Request 312, that the scope of proposed modifications be narrowed due to diminishing coverage in light of existing telecommunications network access nodes in the geographic region. Consequently, Decision Center 330 transmits a coverage return metric to Request Originator 310, the coverage return metric indicating a coverage-to-cost ratio that would enable an approval for First Request 312. 310 then transmits a modified request specifying a smaller addition to the telecommunications network access node than previously suggested. The modified request is accompanied by data, based on which a second justification package is generated. Decision Center 330 then processes the second justification package to render an approval or rejection decision. In a different example, Decision Center 330 determines that there is insufficient data in Justification Package 322 for First Request 312.

Computer System

Figure 4:
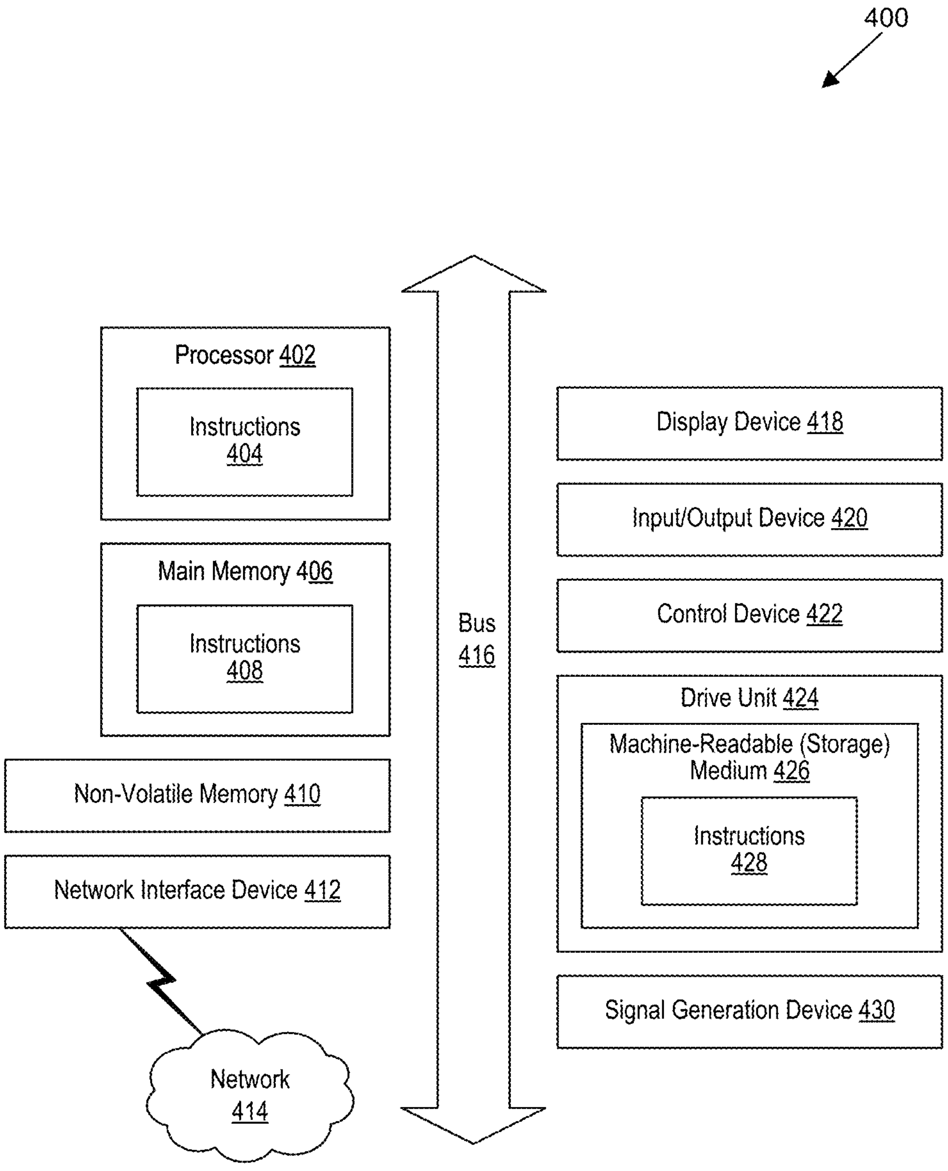
FIG. 4 is a block diagram that illustrates an example of a computer system in which at least some operations described herein can be implemented.

FIG. 4 is a block diagram that illustrates an example of a computer system 400 in which at least some operations described herein can be implemented. As shown, the computer system 400 can include: one or more processors 402, main memory 406, non-volatile memory 410, a network interface device 412, video display device 418, an input/output device 420, a control device 422 (e.g., keyboard and pointing device), a drive unit 424 that includes a storage medium 426, and a signal generation device 430 that are communicatively connected to a bus 416. The bus 416 represents one or more physical buses and/or point-to-point connections that are connected by appropriate bridges, adapters, or controllers. Various common components (e.g., cache memory) are omitted from FIG. 4 for brevity. Instead, the computer system 400 is intended to illustrate a hardware device on which components illustrated or described relative to the examples of the figures and any other components described in this specification can be implemented.

The computer system 400 can take any suitable physical form. For example, the computing system 400 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 400. In some implementation, the computer system 400 can be an embedded computer system, a system-on-chip (SOC), a single-board computer system (SBC) or a distributed system such as a mesh of computer systems or include one or more cloud components in one or more networks. Where appropriate, one or more computer systems 400 can perform operations in real-time, near real-time, or in batch mode.

The network interface device 412 enables the computing system 400 to mediate data in a network 414 with an entity that is external to the computing system 400 through any communication protocol supported by the computing system 400 and the external entity. Examples of the network interface device 412 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 406, non-volatile memory 410, machine-readable medium 426) can be local, remote, or distributed. Although shown as a single medium, the machine-readable medium 426 can include multiple media (e.g., a centralized/distributed database and/or associated caches and servers) that store one or more sets of instructions 428. The machine-readable (storage) medium 426 can include any medium that is capable of storing, encoding, or carrying a set of instructions for execution by the computing system 400. The machine-readable medium 426 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 410, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 404, 408, 428) set at various times in various memory and storage devices in computing device(s). When read and executed by the processor 402, the instruction(s) cause the computing system 400 to perform operations to execute elements involving the various aspects of the disclosure.

Remarks

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

We claim:

1. A system configured to track adjustments to a telecommunications network, the system comprising:
- at least one hardware processor; and
- at least one non-transitory memory storing instructions, which, when executed by the at least one hardware processor, cause the system to:
  - initiate a review session relating to a network access node in a geographic region,
    - wherein the review session is configured to retrieve, create, store, and transmit data in one or more databases;
  - receive a first request to modify the network access node of the telecommunications network,
    - wherein the first request includes accompanying data;
  - generate, using a preprocessing program, a justification package based on the accompanying data,
    - wherein the preprocessing program is configured to cause the system to:
      - perform formatting and data cleansing of the accompanying data;
      - determine population data for the justification package indicative of an estimated population of subscribers of the telecommunications network in the geographic region;
      - determine coverage data for the justification package that describes, based on existing network access nodes adjacent to the network access node, an estimated change in a coverage area caused by the requested modification to the network access node; and
      - retrieve subscriber data that indicates an expected value of subscribers newly using the telecommunications network as a consequence of the modification to the network access node;
  - transmit the justification package to a decision center,
    - wherein the decision center includes one or more software programs configured to process justification packages relating to network access nodes;
  - receive a set of approval or rejection decisions from the decision center;
  - based on the set of approval or rejection decisions from the decision center, generate a first response to the first request; and
  - store the first response, the set of approval or rejection decisions, and the justification package in association with the first request in the review session.

2. The system of claim 1, wherein to determine coverage data comprises causing the system to:
- determine existing coverage in the geographic region based on the existing network access nodes;
- determine a degree of overlap based on the existing coverage; and
- determine the coverage data based on specifications of the network access node and the degree of overlap.

3. The system of claim 1 further caused to determine the subscriber data by being caused to:
- forecast an average of new subscribers in the geographic region that is expected to subscribe for a service of the telecommunications network after the modification to the network access node;
- forecast an average duration of a service plan for the new subscribers; and
- forecast an average value of service plans of the new subscribers.

4. The system of claim 1, wherein to determine population data comprises causing the system to:
- based on federal highway usage information, determine vehicle traffic data of the location comprising daily average highway traffic volume; and
- derive population data based on the vehicle traffic data.

5. The system of claim 1 further caused to:
- receive, in addition to a rejection of the first request:
  - a recommendation for an additional modification to the network access node;
  - a request for information in addition to the accompanying data; or
  - a reason for rejecting the requested modification.

6. The system of claim 1 further caused to:
- generate a return metric based on a growth estimate by causing the system to:
- multiply an average subscriber value relative to an incremental population change,
  - wherein the incremental population change is determined based on the population data, and
- generate a cost estimate that represents a likely cost of the modification to the network access node; and
- divide the growth estimate by the cost estimate.

7. The system of claim 1 further caused to:

generate a cost estimate that represents a likely cost of the modification to the network access node; and generate a coverage return metric by dividing the coverage data by the cost estimate.

8. The system of claim 1, wherein the first request comprises a request to add a new network access node at the geographic region.

9. The system of claim 1, wherein the first request comprises a request to add a new set of transceivers to a cell tower at the geographic region.

10. The system of claim 1 further caused to:

receive a second request including proposals of modifications to the network access node different from the first request in light of the set of approval or rejection decisions;

generate a second justification package corresponding to the second request; and cause the decision center to process the second justification package.

11. The system of claim 1, wherein the request to modify the network access node comprises a request to decommission an existing cell tower at the geographic region.

12. One or more non-transitory computer-readable media comprising instructions that, when executed by one or more processors, cause operations comprising:

initiating a review session relating to a network access node of a telecommunications network in a geographic region, wherein the review session is configured to retrieve, create, store, and transmit data in one or more databases;

receiving a first request to modify the network access node, wherein the first request includes accompanying data;

using a preprocessing program, generating a justification package based on the accompanying data, wherein the preprocessing program, when executed by the one or more processors, cause operations comprising:

performing formatting and data cleansing on the accompanying data;

determining population data for the justification package indicative of an estimated population of subscribers of the telecommunications network in the geographic region;

determining coverage data for the justification package that describes, based on existing network access nodes adjacent to the network access node, an estimated change in a coverage area caused by the requested modification to the network access node; and retrieving subscriber data that indicates an expected value of subscribers newly using the telecommunications network as a consequence of the modification to the network access node;

transmitting the justification package to a decision center, wherein the decision center is a software program configured to process justification packages relating to network access nodes;

receiving a set of approval or rejection decisions from the decision center;

based on the set of approval or rejection decisions from the decision center, generating a first response to the request to modify the network access node; and storing the first response, the set of approval or rejection decisions, and the justification package in association with the first request in the review session.

13. The one or more non-transitory computer-readable media of claim 12, wherein retrieving the subscriber data comprises:

forecasting an average of new subscribers in the geographic region that is expected to sign up for a service of the telecommunications network after the modification to the network access node;

forecasting an average duration of a service plan for the new subscribers; and forecasting an average value of service plans of the new subscribers.

14. The one or more non-transitory computer-readable media of claim 12, wherein determining population data comprises:

based on federal highway usage information, determining vehicle traffic data of the geographic region comprising daily average highway traffic volume; and deriving population data based on the vehicle traffic data.

15. The one or more non-transitory computer-readable media of claim 12, wherein receiving the set of approval or rejection decisions further comprises:

receiving, in addition to a rejection of the first request:

a recommendation for an additional modification to the network access node;

a request for information in addition to the accompanying data; or a reason for rejecting the requested modification.

16. The one or more non-transitory computer-readable media of claim 12, wherein the operations further comprise generating a return metric, comprising:

generating a return metric based on a growth estimate by:

multiplying an average subscriber value relative to an incremental population change, wherein the incremental population change is determined based on the population data, and generating a cost estimate that represents a likely cost of the modification to the network access node; and dividing the growth estimate by the cost estimate.

17. The one or more non-transitory computer-readable media of claim 12, wherein the operations further comprise generating a coverage return metric, comprising:

generating a cost estimate that represents a likely cost of the modification to the network access node; and generating the coverage return metric by dividing the coverage data by the cost estimate.

18. The one or more non-transitory computer-readable media of claim 12, wherein the first request comprises a request to add a new network access node at the geographic region.

19. The one or more non-transitory computer-readable media of claim 12, wherein the first request comprises a request to add a new set of transceivers to a cell tower at the geographic region.

20. The one or more non-transitory computer-readable media of claim 12, the operations further comprising:

receiving a second request that proposes modifications to the network access node, different from the first request in light of the set of approval or rejection decisions;

generating a second justification package corresponding to the second request; and using the decision center to process the second justification package.

* * * * *